United States Patent

[11] 3,586,982

| [72] | Inventor | Robert C. Hoyler<br>Pittsburgh, Pa. |
|---|---|---|
| [21] | Appl. No. | 800,611 |
| [22] | Filed | Feb. 19, 1969 |
| [45] | Patented | June 22, 1971 |
| [73] | Assignee | Westinghouse Electric Corporation<br>Pittsburgh, Pa. |

[54] PULSE COUNT DETECTOR HAVING FAIL-SAFE FEATURES
5 Claims, 2 Drawing Figs.

[52] U.S. Cl. ........................................ 328/48,
328/49, 328/94, 328/127
[51] Int. Cl. ........................................ H03k 21/32
[50] Field of Search ........................................ 328/48, 49,
94, 127

[56] References Cited
UNITED STATES PATENTS

| 3,051,855 | 8/1962 | Lee | 328/49 X |
| 3,287,719 | 11/1966 | Thornberg et al. | 328/48 X |
| 3,383,525 | 5/1968 | Arksey | 328/48 X |

*Primary Examiner*—John S. Heyman
*Attorneys*—F. H. Henson, R. G. Brodahl and M. F. Oglo

ABSTRACT: A flip-flop digital counter is reset periodically by a reset pulse, and upcounted by count pulses. A network is connected to the individual flip-flop outputs to sense presence of a predetermined count condition in the counter together with dynamic behavior of the individual flip-flops. Another network is connected to the individual flip-flops and to the input connection to the reset line to detect simultaneous resetting to zero condition of each flip-flop with appearance of a reset pulse. The output of these two networks is passed to another network with checks for presence of both the count condition and such reset in each count cycle.

INVENTOR
Robert C. Hoyler
BY Michael F. Ogle
ATTORNEY

PULSE COUNT DETECTOR HAVING FAIL-SAFE FEATURES

BACKGROUND OF THE INVENTION

This invention relates to a circuit for detection of the presence of a predetermined count condition in a flip-flop type counter.

There are several failure modes of flip-flop counters which can cause an erroneous output in a circuit of the type referred to. Failure of a stage to properly reset can introduce an error. Failure of a stage to properly "toggle" could also cause such an error. In applications where safety is important, such as the use of a count detection circuit in an automated railway system, it is important that an erroneous output never occur, and that presence of a failure condition always produce a predetermined output signal state.

SUMMARY OF THE INVENTION

The presence of a count condition in a binary counter is detected by two enable gate channels. Both enable gate channels are of a type in which gating is only possible where a predetermined dynamic behavior of switching is present. More particularly change of state of the individual flip-flops at a rate of alternation above a predetermined nominal minimum rate is necessary. One channel is connected to provide an open enable gate circuit in response to presence of a predetermined count condition in the counter. The other channel is connected to provide an open gate circuit in response to simultaneous presence of the zero condition in the individual flip-flops with presence of a reset pulse to the counter. A signal passing through the gate circuit which detects presence of a reset and zero pulse count is then used as an enable signal to allow the signal from the channel which detects the count condition to be effective.

The objectives of the present invention include provision of:

1. an improved count detection circuit in which failure of proper reset or failure of an individual counter flip-flop to properly toggle will not cause an erroneous output.

2. An improved count detection circuit in accordance with the preceding objective which is of special utility in applications requiring failure conditions to yield the same predetermined output signal mode.

DESCRIPTION OF PREFERRED EMBODIMENT

Figure 1:
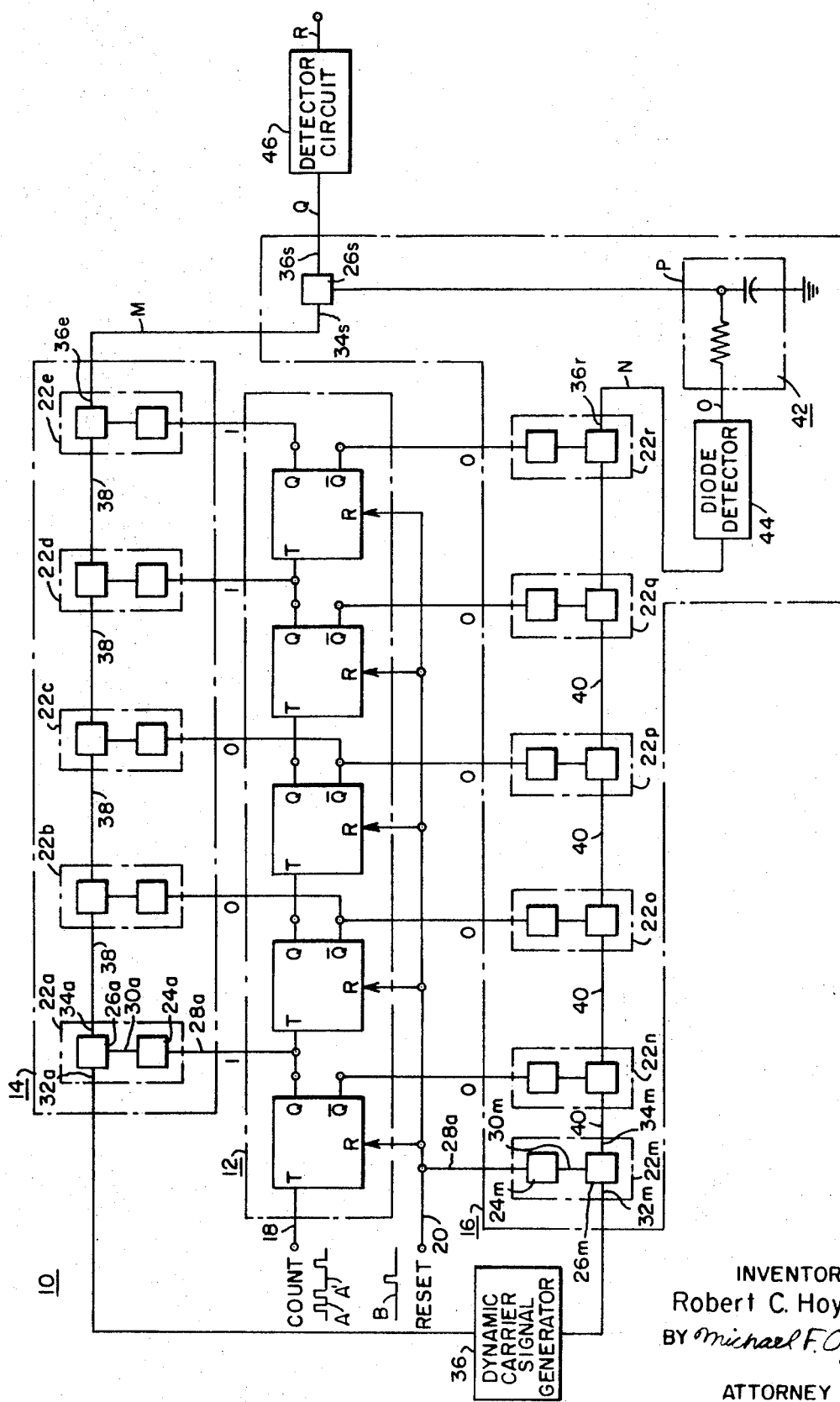
FIG. 1 is a block diagram of the subject of the invention.

Referring now to the drawing and in particular to FIG. 1, a recycling pulse count responsive enable circuit 10 comprises a conventional flip-flop counter 12, a count condition detection network 14, and a valid reset detection network 16. Counter 12 is of the type which operates in a toggle mode in response to positive count pulses which come in on a pulse count input line 18. The count pulses are in the fashion of a regular square wave signal, as indicated on the drawing by Wave A. Counter 12 is a 5-bit counter and is upcounted by 31 pulses followed by a one pulse space indicated in Wave A by the Wave Section A'. Each input pulse adds one count to the counter. During the pulse space, the stages are reset to zero by a reset pulse, wave B, which is applied to a reset pulse input line 20. For further details of the input waves and general operation of the toggle type counter, reference is made to a copending application of Robert C. Hoyler entitled "Synchronous Timing System Having Failsafe Detection Feature", Ser. No. 762,840, filed Sept. 26, 1968, Count condition network 14 functions like an AND-type logic gate to detect a preselected binary count condition. As illustrated in the drawing it is wired to detect a count condition of 11001. When this count condition exists in the counter an output will exist from the overall enable circuit 10. Valid reset detection network 16 detects simultaneous presence of a zero binary count condition with a reset pulse. The purpose for detecting the zero state is to insure that all the flip-flop stages will actually reset to zero when the reset pulse count time occurs. Resetting of all flip-flop stages might not happen if one stage is defective or if a wire connection has broken or some other failure has occurred. It is important to insure that the counter 12 resets back to zero because the operation of the count detection network 14 would be in error if the counter started from some condition other than zero.

Counter 12 consists of five standard flip-flop stages FF1, FF2...FF5. Each stage has a toggle input. The appearance of a pulse at an input T causes the output of the flip-flop to shift to the opposite state. For example, assume a flip-flop is in its BINARY ONE count state in which its Q output terminal is at a HIGH DC voltage amplitude state and its $\bar{Q}$ output terminal at a LOW state. The appearance of a ONE pulse at input T-shifts the flip-flop to its BINARY ZERO state in which its output Q is LOW and its output $\bar{Q}$ is HIGH. The flip-flops also have a capability of resetting to the BINARY ZERO condition by another means. This is done by applying a pulse to a reset input R which resets the stage to its BINARY ZERO state if not already in that state. Reset pulse input line 20 connects to the reset inputs R of all the flip-flops FF.

In addition to the described functions, detection networks 14 and 16 are both of a type which further function as dynamic digital operation confidence network. This is done by a construction of sensor and enable gate stages 22, which are also sometimes referred to as "fail safe AND gate stages". Count condition detection network 14 comprises a series of sense and enable gate stages 22a, 22b, 22c, 22d and 22e are selectively connected to the one or the other of the Q or $\bar{Q}$ outputs of flip-flops FF1, FF2, FF3, FF4 and FF5 which are in their HIGH state in count condition 11001. Valid reset AND network 16 comprises sense and enable gate stages 22m, 22n, 22o, 22p, 22q and 22r connected to reset line and to the $\bar{Q}$ outputs of flip-flop FF1...FF5.

Sense and enable gate stages 22 are all alike and the description of stage 22a will serve for all. Stage 22a has two subcircuits consisting of a unidirectional charge path capacitor subcircuit 24a and a power switched AC enable gate and threshold subcircuit 26a. Enable gate subcircuit 26a is basically a unity gain amplifier containing an active amplifying device which allows an AC signal to be translated therethrough when its active device is energized and when the AC signal exceeds a predetermined threshold. Unidirectional charge path capacitor subcircuit 24a is basically a power-switching control which energizes the active device gate and threshold subcircuit 26a. It has a sense input 28a and an ON-OFF power signal output 30a. The output 30a is actuated to its ON power signal state in response to a HIGH state signal at its sense input line 28a, but only when the binary data signal sensed is behaving in a proper dynamic manner. What is meant by a proper dynamic manner is that alterations between the HIGH and LOW signal states are occurring at a frequency of alternation above a predetermined minimum frequency. In the case of enable circuit 10 this minimum frequency of alternation is chosen to equal the normal reset cycle of WAVE B. Unidirectional charge path capacitor subcircuit 24 is effectively a combination of a logic gate and a high pass dynamic frequency selective circuit. It is responsive to two conditions: (1) an instantaneous input signal of the HIGH DC amplitude state of the binary signal system at output Q of flip-flop FF1; and (2) the signal at output Q behaving in a predetermined dynamic manner consisting of alternation between the HIGH and LOW AC amplitude states at a frequency of alternation nominally equal to, or above that of the reset pulse. When these tow conditions are present a DC signal level suitable to energize the active device in gate and threshold circuit is provided at its output 30a. Gate and threshold subcircuit 26a has an AC carrier input line 32a and an AC carrier output line 34a. Subcircuit 26a acts as an enable gate which passes a periodic dynamic signal only when power is applied to its active device from line 30a. It is further of a type which is designed to cooperate with a predetermined waveform of dynamic signal. When this predetermined waveform appears at its carrier input 32a, subcircuit 24a performs an amplification followed by an attenuation that yields a net gain of unity. Preferably, subcircuit 26a also contains a feature providing a thresholding action at a threshold level a predetermined amplitude of the dynamic signal. It is seen therefore, that each stage 22 operates as an "AND" gate, and other "AND" gates known in the art may be used in the practice of the invention. For further details of the construction and operation of sense and enable gate stages 22 reference is made to the copending application of George M. Thorne-Booth entitled "Family of AC Enable Channel Circuits For Use As Fail Safe Logic Gates of Electronic Relays," filed Dec. 3, 1968, Ser. No. 780,622, wherein the stage 30 (FIG. 1) corresponds to the stage 22 in the instant application.

A dynamic carrier signal generator 36 produces a periodically varying dynamic signal, sometimes simply referred to as an AC signal, of a relatively high frequency and having a waveform which is suitable for the operation of gate and threshold subcircuits 26. The generator 36 is a standard pulse generator known in the art and may be the type generator 28 (FIGS. 1 and 3) disclosed in the last-named application. The carrier signal input line 32 and the carrier output lines 34 of the series of stages 22a, 22b...22e are connected to place the gate and threshold subcircuits in cascade relationship, forming a count condition detection AC enable signal channel 38. An output consisting of a pulse, or a short burst of the high frequency carrier will exist at carrier signal output line 34e of stage 22e as the output of this channel when each of its individual stages sense a HIGH signal with the required dynamic signal state. The sense inputs 28 of this series of stages are connected to one and the other of the Q and $\overline{Q}$ to produce this burst of high frequency signals when the count condition of twenty-five (decimal) or 11001 (binary) is reached in the counter. Similarly, the carrier input lines 32 and carrier output lines 34 of series of stages 22m, 22n...22r are connected to form a valid reset detection AC enable signal channel 40. The sense input 24m of stage 22m is connected to respond to the presence of a reset pulse on line 18, and those of the other stages of the series connected to the $\overline{Q}$ outputs of the series of flip-flops FF1...FF5. Accordingly, count condition responsive network 14 is connected to produce this burst of high frequency signals when count condition 11001 is reached and valid reset detection network 16 is connected to respond the same when all of the stages are reading zero and the reset pulse is present. If the reset pulse is present at the same time as all stages of the counter are in their ZERO state this indicates the unit is properly resetting and that a subsequent count will therefore be valid.

Thus, by sensing whether we have a valid condition under reset and then enabling the output from the count condition selector network 14, count condition response selector circuit 10 is provided with desired properties of fail-safeness against failure of its reset mechanism. This is done by a subsequent enable gating of the output of count condition AC enable channel 38 by the signal that comes out of the valid reset detection AC enable channel 40. By this means, absence of a proper zero reset prevents translation of a count condition output. Because the valid reset detection occurs at a different point in time than the count condition detection output, it cannot be added directly. Therefore the valid reset output is stretched forward at least one cycle of counter 12 (i.e. from the time of the reset pulse for a period at least as long as the time to where the count condition occurs). This is done by a simple resistance-capacitance (R-C) filter 42 which affectively takes the signal from channel 40 and remembers it sufficiently long enough that it can enable the count condition signal from channel 38 to produce an output which corresponds to the count condition signal. More particularly, the output from the AC enable channel 40 is first applied to a standard diode detector 44 which then produces a low frequency DC pulse. This detected signal is the integrated, or stretched, by the R-C circuit 42 to become the ON power signal for a gate and threshold subcircuit 26s. Subcircuit 26s does not have an associated subcircuit 24. Instead it works alone providing the enable gating function. The output from count condition detection AC enable signal channel 40 is applied to the carrier input line 34s of subcircuit 26s. Subcircuit 26s allows the signal from channel 40 to pass therethrough if the stretched valid reset signal from R-C circuit 42 is present. From the AC carrier output line 36s of subcircuit 26s the signal goes to a detector circuit 44, the output of which is the output of count condition selector circuit 10.

Figure 2:
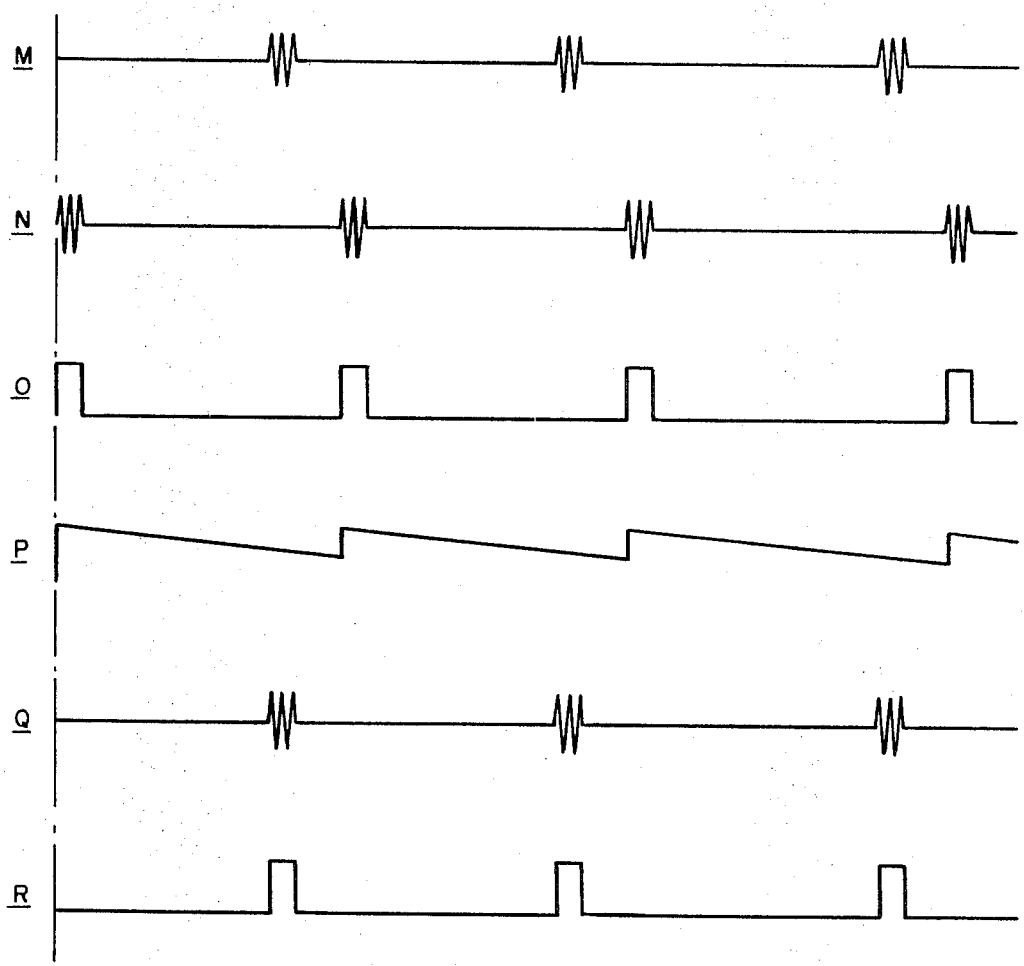
FIG. 2 is a family of waveforms found in various parts of the block diagram of FIG. 1.

Operation of pulse count responsive circuit 10 will be better understood by reference to the waveforms of FIGS. 2. Bursts of high frequency signal, wave M, occur at the AC carrier output 36e at the end of channel 38 every time a count condition of 11001 is present in counter 12. Bursts of AC carrier signal, wave N, occur at AC carrier output 36r at the end of channel 40 in response to the reset pulses of Wave B and the simultaneous resetting of each of the flip-flops to their ZERO condition. Diode detector 44 rectifies the bursts in wave N producing DC pulses, Wave O, for the duration of the bursts. These pulses are then put into R-C network which stretches them into a decaying Wave P. The pulse is stretched sufficiently so that wherever signal M occurs in the cycle it will be enabled to pass through the gate and threshold subcircuits 26s. Thus signal P dies away at such a rate that it is not completely gone by the time pulse signal O again reappears. Should signal O drop out, then signal P would die down to ZERO and signal N would not be gated through subcircuit 26s. In the case illustrated by the waveforms signal O is occurring in its proper manner indicating that circuit 10 is properly resetting to ZERO at the correct time. Therefore signal P does not completely die away and enables signal M to pass through subcircuit 26s and appear at the AC carrier output line 36s thereof as signal Q. Detector circuit 46 rectifies the bursts of Wave Q producing the DC pulse Wave R at its output. Signal R constitutes the count condition detection signal output of circuit 10 which is safely interlocked to indicate that it positively is concurrent with the desired count condition and not an erroneous count condition.

An important application of circuit 10 is to enable a multiplex receiving station in a time-division type multiplex system. The multiplex system is timed by a synchronously reset counter at each receiver station. The station is enabled to receive signal information from a multiplex transmission line in response to detection of particular count condition only. In many uses it is important that a particular station receive only the information sent to the station because receiving information intended for some other station could result in an unsafe condition. An example of such a use is disclosed in the hereinbefore mentioned copending application "Control of a Vehicle Along a Path Divided Into a Plurality of Signal Blocks", Ser. No. 762,563 filed Sept. 25, 1968 and assigned to the assignee of the instant invention. There the multiplex system is used to send signals to individual railway speed signal blocks. Response to an erroneous count would result in transmission of the wrong signal to a speed block which in turn could possibly result in a catastrophic railway accident.

In standard (without fail-safe features) counter and count condition detection schemes it is possible for a number of types of failure modes to occur yielding erroneous count detection outputs. If one of the stages of the counter should fail and not count properly it is possible for an erroneous count to be detected at the output. If the counter stages should not reset properly it is also possible for an erroneous count to be detected at the output. It will be appreciated that the count responsive enable circuit 10 has taken care of these failure modes, because if one of the stages fails it will not produce a dynamic output, and the sense and enable gate stage associated with that flip-flop would not pass a signal. No signal would get through the series cascade connection of sense and enable gate stages forming the AC enable signal channel. If the reset fails then there will be a failure of the zero sense arrangement and again there will be no output.

Further there should be no unsafe failures in the AC enable signal channels or the sense and enable gate stages of which these channels are formed. For example, if a sense and enable gate stage would short circuit, it would allow a signal through which perhaps should not be allowed through, thereby resulting in an unsafe output. The possibility of such occurrence may be completely eliminated by following the teachings of the hereinbefore mentioned copending application "Family of AC Enable Channel Circuits for Use as Fail-Safe Logic Gates or Electronic Relays." These teachings provide constructions in which virtually all possibly failure modes of the sense and enable gate stages yield a common output signal of zero output, so that no erroneous detection of a count output will occur.

While circuit 10 illustrates the output of valid reset AC enable signal channel 40 operating an enable gate 26s, it will be appreciated that there are many other ways of interlocking the count detection output to the zero sense output. For example, the output of valid reset channel 40 could be used to enable another operation in the total system environment which determines ultimate utilization of the count pulse. That operation may take a form quite different from action of a gate circuit, such as a phase-shifting operation or the like. In still another alternative a dynamic signal could be derived directly from the presence an output from the valid reset channel 40, and this could be used to interlock any other AC enable channel upon which ultimate utilization of a count pulse depended.

I claim:

1. In a count condition responsive circuit, the combination comprising:
    counter means comprising a plurality of bistable elements and including a count signal input and a reset signal input, said counter means being reset to a zero binary state in response to a reset signal and to count up in response to a count signal;
    first means for providing an output signal in response to a predetermined count condition in the counter means;
    second means responsive to each of the bistable elements being concurrently reset for validating said output signal;
    said first and second means each comprising a series of enable gate circuits cascade connected to form an enable signal channel, with one enable gate circuit being connected to each bistable element, with each enable gate circuit including a binary signal state sensing circuit operative to actuate the enable gate circuit to a signal passing condition in response to the bistable element to which it is connected producing a predetermined binary signal state at a frequency in excess of a predetermined minimum frequency.

2. In combination:
    an $n$ stage counter, where $n$ is an integer, which counts in response to count pulses;
    first means responsive to a predetermined count from said counter concurrent with the application of an input signal to said first means for producing a first signal;
    second means responsive to said counter being reset for producing a second signal;
    third means responsive to said second signal for producing a third signal having a time duration at least as long as the time duration needed for said counter to count to said predetermined count; and
    fourth means responsive to the concurrent production of said first and third signals for producing an output signal.

3. In combination:
    an $n$ stage counter, where $n$ is an integer, which counts in response to count pulses;
    first means responsive to a predetermined count from said counter concurrent with the application of an input signal to said first means for producing a first signal;
    second means responsive to said counter being reset concurrent with the application of said input signal to said second means for producing a second signal;
    third means responsive to said second signal for producing a third signal of a time duration at least as long as the time duration needed for said counter to count to said predetermined count after being reset; and
    fourth means responsive to the concurrent production of said first and third signals for producing an output signal.

4. In combination:
    first means for generating a periodic signal;
    an $n$ stage counter, where $n$ is an integer, which counts in response to input pulses;
    second means having an input to which said periodic signal may be applied, and an output where said periodic signal is reproduced in response to a predetermined count from said counter;
    third means having an input to which said periodic signals may be applied, and an output where said periodic signal is reproduced in response to said counter being reset; and
    fourth means responsive to said periodic signal being reproduced at the output of said third means for producing a pulse having a time duration at least as long as the time duration needed for said counter to count to said predetermined count after being reset; and
    fifth means responsive to said periodic signal being reproduced at the output of said second means concurrent with the production of said pulse by said fourth means for reproducing said periodic signal.

5. The combination claimed in claim 4 said fourth means comprising an integrator.